(12) United States Patent
Ando

(10) Patent No.: US 8,514,096 B2
(45) Date of Patent: Aug. 20, 2013

(54) NETWORK DEVICE

(75) Inventor: Satoko Ando, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 573 days.

(21) Appl. No.: 12/712,473

(22) Filed: Feb. 25, 2010

(65) Prior Publication Data

US 2010/0245108 A1   Sep. 30, 2010

(30) Foreign Application Priority Data

Mar. 25, 2009   (JP) .................................. 2009-073772

(51) Int. Cl.
*G08B 5/00*   (2006.01)

(52) U.S. Cl.
USPC ....... 340/815.45; 340/635; 340/331; 340/332

(58) Field of Classification Search
None
See application file for complete search history.

(56) References Cited

U.S. PATENT DOCUMENTS

| | | | |
|---|---|---|---|
| 5,697,717 A * | 12/1997 | Kaneko et al. ................ | 400/703 |
| 5,938,772 A | 8/1999 | Welch | |
| 6,353,893 B1 * | 3/2002 | Liu et al. ...................... | 713/323 |
| 7,123,375 B2 | 10/2006 | Nobutani et al. | |
| 7,555,662 B2 | 6/2009 | Kidoguchi | |
| 7,894,085 B2 | 2/2011 | Maeda | |
| 8,213,026 B2 | 7/2012 | Sugiyama | |
| 2002/0035702 A1 * | 3/2002 | Chu et al. ..................... | 713/323 |
| 2002/0159090 A1 | 10/2002 | Nobutani et al. | |
| 2006/0038506 A1 * | 2/2006 | Rose et al. .................... | 315/247 |
| 2006/0236143 A1 | 10/2006 | Kidoguchi | |
| 2007/0146775 A1 | 6/2007 | Maeda | |
| 2008/0080676 A1 | 4/2008 | Milne et al. | |
| 2008/0158574 A1 | 7/2008 | Sugiyama | |
| 2011/0121928 A1 * | 5/2011 | Qu .................................. | 336/65 |
| 2011/0199226 A1 * | 8/2011 | Gong et al. ............. | 340/815.45 |

FOREIGN PATENT DOCUMENTS

| | | |
|---|---|---|
| JP | 8-069225 A | 3/1996 |
| JP | 09-307673 | 11/1997 |
| JP | 2001160790 A | 6/2001 |
| JP | 2002141910 A | 5/2002 |

(Continued)

OTHER PUBLICATIONS

Notification of First Office Action for Chinese office action No. 201010150519.X mailed Aug. 24, 2011.

(Continued)

*Primary Examiner* — Julie Lieu
(74) *Attorney, Agent, or Firm* — Banner & Witcoff, Ltd.

(57) ABSTRACT

A network device may be configured to connect with an external device over a network. The network device may be provided with a light emitting element configured to indicate information concerning network communications, and a control unit. The network device may be configurable to any of a plurality of performance states including a first performance state and a second performance state. Power consumption in the second performance state may be smaller than power consumption in the first performance state. The control unit may allow emission of the light emitting element when the network device is set in the first performance state, and may control the light emitting when the network device is set in the second performance state such that power consumption of the light emitting element in the second case is smaller than power consumption of the light emitting element in the first case.

9 Claims, 4 Drawing Sheets

(56) References Cited

FOREIGN PATENT DOCUMENTS

| JP | 2002-300644 | 10/2002 |
|---|---|---|
| JP | 2002-307783 A | 10/2002 |
| JP | 2003-108273 | 4/2003 |
| JP | 2003-228313 A | 8/2003 |
| JP | 2005088499 A | 4/2005 |
| JP | 2006-048502 | 2/2006 |
| JP | 2006-179619 A | 7/2006 |
| JP | 2006-259906 A | 9/2006 |
| JP | 2007-006096 | 1/2007 |
| JP | 2007-098920 A | 4/2007 |
| JP | 2007-159057 | 6/2007 |
| JP | 2008-167224 A | 7/2008 |
| WO | 2009-072356 | 6/2009 |

OTHER PUBLICATIONS

Notification of Reasons for Rejection for Japanese Patent Application No. 2009-073772 mailed Nov. 9, 2010.
European Search Report for EP Application No. 10250365.3 dated Jul. 1, 2010.
Decision of Rejection for Japanese patent application No. 2009-073772 mailed Mar. 8, 2011.
Extended European Search Report dated Jan. 31, 2011 in Application No. 10250365.3.
Notification of Reasons for Rejection for corresponding Japanese Patent Application 2011-123953 dated Jun. 26, 2012.
Japanese Office Action issued in corresponding Japanese Patent Application No. 2011-123953 mailed Mar. 5, 2013.

* cited by examiner

FIG. 2

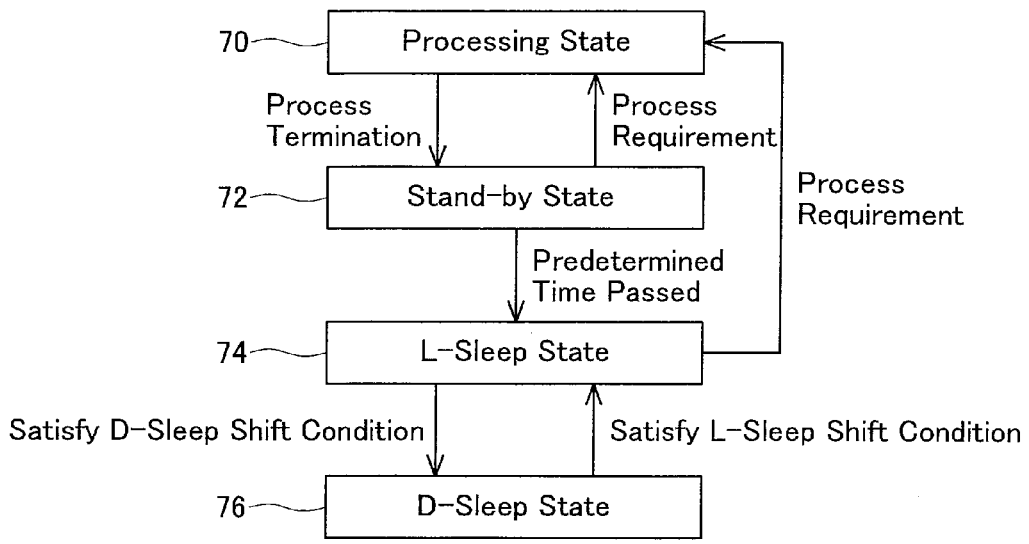

FIG. 3

| State of MFD | Main CPU | Sub CPU | LCD | First and Second LED |
|---|---|---|---|---|
| Processing State 70 | Clock Supplied | Clock Supplied | ON | Output Enabled State |
| Stand-by State 72 | Clock Supplied | Clock Supplied | ON | Output Enabled State |
| L-Sleep State 74 | Clock Supplied | Clock Supplied | OFF | Output Disabled State (Become Output Enabled State in a Case Where Condition is Satisfied) |
| D-Sleep State 76 | Clock Suspended | Clock Supplied | OFF | Output Disabled State (Become Output Enabled State in a Case Where Condition is Satisfied) |

First LED (Orange Color)··· Indicating Speed
(Lighting: 100Mbps  Light Off: 10Mbps)

Second LED (Green Color)··· Indicating Activity and Link
( Lighting: Link Up
  Blinking: In Packet Communication
  Light Off: Link Down )

NETWORK DEVICE

CROSS-REFERENCE TO RELATED APPLICATION

This application claims priority to Japanese Patent Application No. 2009-073772, filed on Mar. 25, 2009, the contents of which are hereby incorporated by reference into the present application.

TECHNICAL FIELD

This specification relates to a network device to be connected with an external device in a communicable manner via a network.

DESCRIPTION OF RELATED ART

A multi-function device to be connected with a PC in a communicable manner is known. If the multi-function device is not used continuously for a predetermined time in a normal state, the multi-function device is set in a power saving state in which the power consumption is lower than the normal state.

SUMMARY

Further power saving is sought in a network device. This specification discloses technology for realizing the power saving of a network device using a method that is different from conventional methods.

One aspect disclosed in the present specification is a network device configured to be connected with an external device in a communicable manner via a network. The network device may comprise a first light emitting element configured to indicate a first type of information concerning a communication of data via the network, and a light emitting element control unit configured to control the first light emitting element. The network device may be configured to be set in any one of a plurality of performance states including a first performance state and a second performance state. Power consumption in the second performance state may be smaller than power consumption in the first performance state. The light emitting element control unit may be configured to allow emission of the first light emitting element in a first case where the network device is set in the first performance state, and control the first light emitting element in a second case where the network device is set in the second performance state such that power consumption of the first light emitting element in the second case is smaller than power consumption of the first light emitting element in the first case.

The foregoing sentence of "The network device may be configured to be set in any one of a plurality of performance states including a first performance state and a second performance state" may also be rephrased, but not limited to, as "a particular device included in the network device is set in any one of a plurality of performance states including a first performance state and a second performance state". In addition, the foregoing expression of "first case (or second case)" may mean, but not limited to, an entire period that the network device is set in the first performance state (or the second performance state), or mean, but not limited to, a part of the entire period. For example, if the network device is set in the first performance state and a timing of switching from the first performance state to the second performance state is known in advance, a control of the first light emitting element may be started in the same manner as the second case from a predetermined period before the timing. In addition, if the network device is set in the second performance state and a timing of switching from the second performance state to the first performance state is known in advance, a control of the first light emitting element may be started in the same manner as the first case from a predetermined period before the timing.

Further, the light emitting element control unit will suffice so as long as it is able to control the first light emitting element as described above, and is not required to constantly control the first light emitting element as described above. For instance, the network device may be configured to be set to either mode; specifically, the first mode or the second mode. If the light emitting element control unit is set to the first mode, it may control the first light emitting element as described above. If the light emitting element control unit is set to the second mode, even if it is the second case, it may control the first light emitting element in the same manner as the first case.

A control method and computer program for realizing the foregoing network device are also novel and effective. A computer readable medium including the computer program is also novel and effective. The network system including the foregoing network device and external device is also novel and effective.

BRIEF DESCRIPTION OF DRAWINGS

FIG. 2 is a diagram for explaining a situation where a state of a multi-function device is changed.

FIG. 3 shows a relationship between a state of the multi-function device and a state of each unit.

DETAILED DESCRIPTION OF THE PREFERRED EMBODIMENT (Configuration of System)

Figure 1:
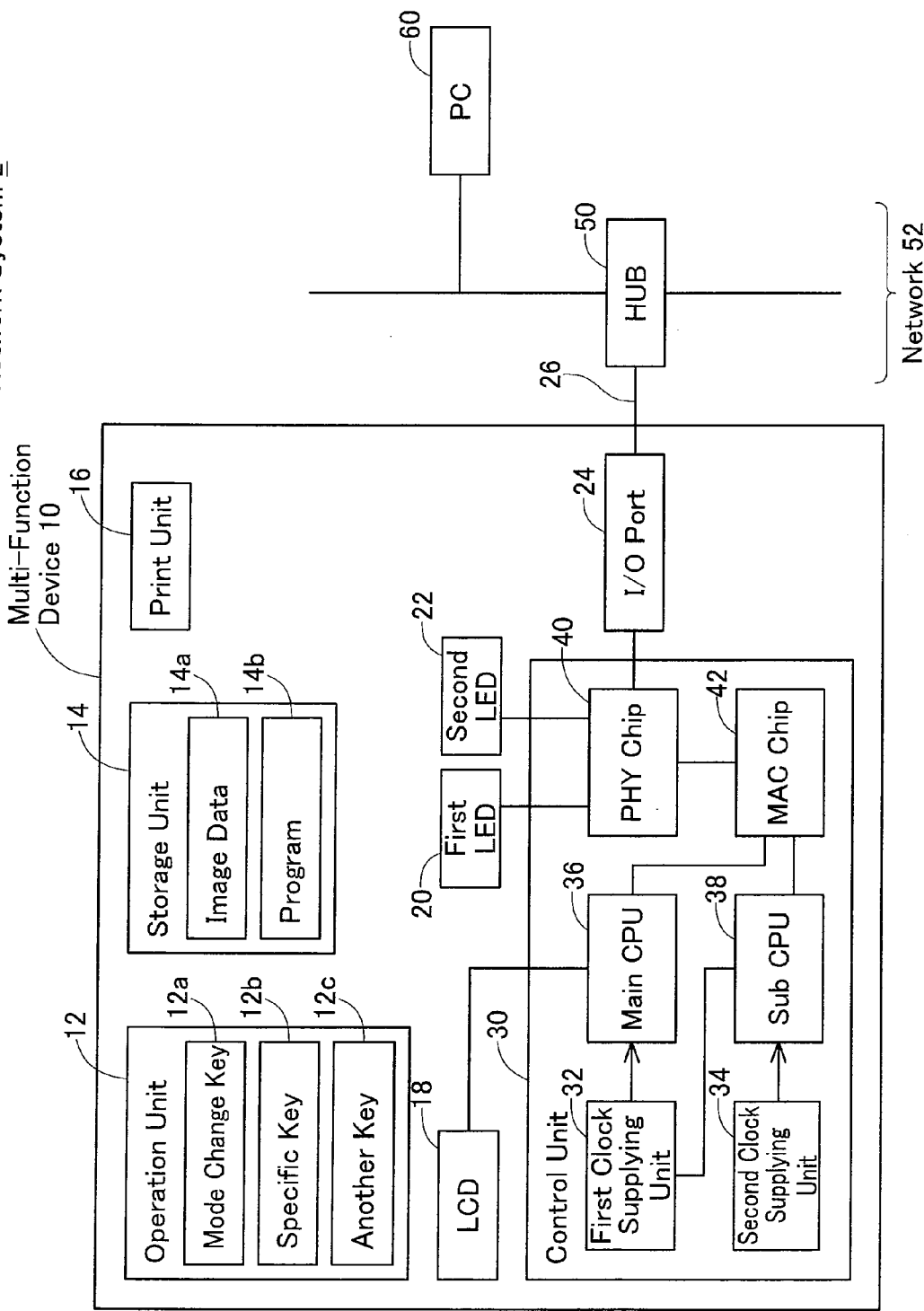
FIG. 1 shows an example of a configuration of a network system.

An embodiment is now explained with reference to the attached drawings. As shown in FIG. 1, a network system 2 comprises a multi-function device 10, a network 52, a PC 60 and so on. The multi-function device 10 and the PC 60 are mutually communicable via the network 52. The network 52 comprises a HUB 50.

(Configuration of Multi-Function Device 10)

The multi-function device 10 comprises an operation unit 12, a storage unit 14, a print unit 16, an LCD (Liquid Crystal Display) 18, a first LED 20, a second LED 22, an I/O port 24, and a control unit 30. The operation unit 12 comprises a plurality of keys 12a, 12b, 12c. The mode change key 12a is a key for setting the mode to either the first mode or the second mode. The first mode is a mode for setting the first and second LEDs 20, 22 to an output disabled state in an L-sleep state and a D-sleep state described later. The second mode is a mode for maintaining the first and second LEDs 20, 22 in an output enabled state in both the L-sleep state and the D-sleep state. The specific key 12b is a key for temporarily setting the first and second LEDs 20, 22 to the output enabled in the L-sleep state or the D-sleep state state while the first mode is being set.

The storage unit 14 stores image data (for instance, menu image data) 14a to be displayed on the LCD 18. The storage unit 14 further stores a program 14b to be executed by the control unit 30. The print unit 16 prints print data sent from the PC 60. The LCD 18 displays various types of information. The first and second LEDs 20, 22 are provided on the rear face of the multi-function device 10. The I/O port 24 is also provided on the rear face of the multi-function device 10. The first and second LEDs 20, 22 are provided in the vicinity of the I/O port 24. The specific key 12b is disposed in the vicinity of the I/O port 24 (in other words, in the vicinity of the first and second LEDs 20, 22). One end of a LAN cable 26 is connected to the I/O port 24. The HUB 50 is connected to the other end of the LAN cable 26.

The first LED 20 is an LED of a first color (for instance, an orange color). The first LED 20 shows information concerning a line speed of the network 52. In the ensuing explanation, this information is referred to as "Speed." In this embodiment, the first LED 20 is controlled to continuously light in a case where the line speed is 100 Mbps, and the first LED 20 is controlled to be unlit in a case where the line speed is 10 Mbps.

The second LED 22 is an LED of a second color (for instance, a green color) that is different from the first color. The second LED 22 shows information indicating whether the multi-function device 10 is being connected to the network 52 in a communicable manner. In the ensuing explanation, this information is referred to as "Link." In addition, a state where the multi-function device 10 is being connected to the network 52 in a communicable manner is referred to as the "link-up state," and a state where the multi-function device 10 is not being connected to the network 52 in a communicable manner is referred to as the "link-down state." As an example of the link-down state, for instance, considered may be a state where the LAN cable 26 is not being connected to the I/O port 24, or a state where the LAN cable 26 is being connected to the I/O port 24 but the HUB 50 is inoperative. In this embodiment, the second LED 22 is controlled to continuously light in the case of the link-up state, and the second LED 22 is controlled to be unlit in the case of the link-down state.

The second LED 22 further shows information indicating whether data being communicated (sent and/or received) via the network 52 exists (in other words, information indicating whether the multi-function device 10 is in the midst of communicating data). In the ensuing explanation, this information is referred to as "Activity." In this embodiment, the second LED 22 is controlled to blink in a case where the multi-function device 10 is in the midst of communicating data. As described above, the state must be a link-up state in order to communicate data. Thus, when the communication of the multi-function device 10 is ended, the blinking of the second LED 22 is also ended, and the second LED 22 is controlled to countinusouly light.

The control unit 30 comprises a first clock supplying unit 32, a second clock supplying unit 34, a main CPU 36, a sub CPU 38, a PHY (Physical Layer) chip 40, and a MAC (Media Access Control) chip 42. The first clock supplying unit 32 supplies a clock to the main CPU 36. The second clock supplying unit 34 supplies a clock to the sub CPU 38. The operating frequency of the main CPU 36 is greater than the operating frequency of the sub CPU 38.

The main CPU 36 executes various types of processing according to the program 14b stored in the storage unit 14. The types of processing to be executed by the main CPU 36 are listed below.

(1) The main CPU 36 executes a processing for switching a light source of the LCD 18 between a lit state and an unlit state. The main CPU 36 further executes display processing for supplying the image data 14a stored in the storage unit 14 to the LCD 18, and displaying the image data 14a on the LCD 18.

(2) The main CPU 36 executes a processing of data to be communicated with the PC 60. For example, the main CPU 36 executes a print processing for driving the print unit 16 based on a print command packet that is sent from the PC 60.

(3) The main CPU 36 executes, in the case where the first mode is being set, a processing for switching the first and second LEDs 20, 22 between the output disabled state and the output enabled state. Specifically, the main CPU 36 executes a processing of sending a command for setting the first and second LEDs 20, 22 to the output disabled state or the output enabled state to the PHY chip 40 via the MAC chip 42. In the ensuing explanation, the command for setting the first and second LEDs 20, 22 to the output enabled state is referred to as an "output enable command," and the command for setting the first and second LEDs 20, 22 to the output disabled state is referred to as an "output disable command."

The sub CPU 38 executes various types of processing according to the program 14b stored in the storage unit 14. The types of processing to be executed by the sub CPU 38 are listed below.

(1) The sub CPU 38 executes a processing for switching the first clock supplying unit 32 between a clock supply execution state and a clock supply suspended state. Specifically, in this embodiment, there is a state where the clock supply to the main CPU 36 is suspended (sleep state of the main CPU 36). In this embodiment, in a state where the power of the multi-function device 10 is ON, the clock supply to the sub CPU 38 is constantly executed.

(2) The sub CPU 38 executes, in a case where a particular packet is received from the PC 60 while the main CPU 36 is in the sleep state, a processing (for instance, reply processing) of the particular packet.

(3) The main CPU 36 executes, in the case where the first mode is being set, a processing for switching the first and second LEDs 20, 22 between the output disabled state and output enabled state while the main CPU 36 is in the sleep state. Specifically, the sub CPU 38 executes a processing for sending the output enable command or the output disable command to the PHY chip 40 via the MAC chip 42.

The PHY chip 40 executes a processing of the physical layer of the OSI (Open Systems Interconnection) reference model. The PHY chip 40 is connected to the I/O port 24. The PHY chip 40 is connected to the MAC chip 42. The PHY chip 40 is also connected to the first and second LEDs 20, 22. The PHY chip 40 detects Speed, Link, and Activity. In a case where the PHY chip 40 receives the output enable command from the main CPU 36 or the sub CPU 38, the PHY chip 40 executes a processing for supplying current to the first and second LEDs 20, 22 according to the Speed, Link, and Activity that have been detected by itself. In a case where the PHY chip 40 receives the output disable command from the main CPU 36 or the sub CPU 38, the PHY chip 40 executes a processing for stopping the supply of current to the first and second LEDs 20, 22.

The MAC chip 42 executes a processing of the MAC layer which is a sub layer of the data link layer of the OSI reference model. The MAC chip 42 is connected to the PHY chip 40. The MAC chip 42 is connected to the main CPU 36 and the sub CPU 38.

(States of Multi-Function Device 10)

The states of the multi-function device 10 are now explained. FIG. 2 shows the situation of the state of the multi-function device 10 being changed. FIG. 3 shows the relationship between the state of the multi-function device 10 and the state of the each unit 18, 20, 22, 36, 38. Note that FIG. 3 shows the state of the first and second LEDs 20, 22 in the case of the first mode being set. As shown in FIG. 2, the multi-function device 10 changes among the following states; namely, processing state 70, stand-by state 72, L-sleep (Light sleep) state 74, and D-sleep (Deep sleep) state 76. The processing state 70 is a state where the main CPU 36 is executing a specific processing. Here, as examples of the specific processing, considered may be the foregoing print processing, display processing, and the like. As shown in FIG. 3, in the processing state 70, the clock is supplied to the main CPU 36 and the sub CPU 38. In the processing state 70, the light source of the LCD 18 is in the lit state, and the image data 14a is supplied to the LCD 18. In addition, in the processing state 70, the first and second LEDs 20, 22 are in the output enabled state. Specifically, the first and second LEDs 20, 22 are allowed the emission indicating Speed, Link, and Activity.

As shown in FIG. 2, when the main CPU 36 completes the foregoing specific processing (print processing, display processing or the like), the state proceeds to the stand-by state 72. As shown in FIG. 3, in the stand-by state 72, the clock is supplied to the main CPU 36 and the sub CPU 38. In addition, in the stand-by state 72, the light source of the LCD 18 is in the lit state, and the first and second LEDs 20, 22 are in the output enabled state.

As shown in FIG. 2, if a command is input for executing the foregoing spesific processing in the stand-by state 72 (for instance, reception of the print packet or operation of the key 12c (refer to FIG. 1) by the user), the state proceeds to the processing state 70. Moreover, if a state where a command for executing the foregoing specific processing is not input in the stand-by state 72 continues for a predetermined time, the state proceeds to the L-sleep state 74. As shown in FIG. 3, in the L-sleep state 74, the clock is supplied to the main CPU 36 and the sub CPU 38. In the L-sleep state 74, the light source of the LCD 18 is in the unlit state. If the mode is being set to the first mode, the first and second LEDs 20, 22 are in the output disabled state in the L-sleep state 74. As explained in detail later, even in the output disabled state, if a condition (condition of S30 or S32 of FIG. 6) is satisfied, the first and second LEDs 20, 22 temporarily become the output enabled state. If the mode is being set to the second mode, the first and second LEDs 20, 22 are maintained in the output enabled state even in the L-sleep state 74.

As shown in FIG. 2, if the command is input for executing the foregoing specific processing in the L-sleep state 74, the state proceeds to the processing state 70. If a specific condition is satisfied in the L-sleep state 74, the state proceeds to the D-sleep state 76. In this embodiment, the foregoing specific condition is that data is not being communicated, and there is no packet for which the main CPU 36 should execute processing. As shown in FIG. 3, in the D-sleep state 76, the clock supply to the main CPU 36 is suspended. That is, the main CPU 36 is in the sleep state. In the D-sleep state 76, the light source of the LCD 18 is in the unlit state. If the mode is being set to the first mode, the first and second LEDs 20, 22 are in the output disabled state in the D-sleep state 76 (however, they temporarily become the output enabled state if a condition is satisfied). If the mode is being set to the second mode, the first and second LEDs 20, 22 are maintained in the output enabled state even in the D-sleep state 76.

As shown in FIG. 2, if the command is input for executing the foregoing specific processing in the D-sleep state 76, the state proceeds the L-sleep state 74 (in other words, the clock supply to the main CPU 36 is resumed), then proceeds to the processing state 70.

In this embodiment, if the state of the multi-function device 10 is in the L-sleep state 74 and the D-sleep state 76, the light source of the LED 18 is set to the unlit state. Specifically, the L-sleep state 74 and the D-sleep state 76 are states in which the user recognizes the multi-function device 10 to be in a low power consumption state (sleep state) upon observing the multi-function device 10. Although the main CPU 36 will not receive the supply of the clock and be set to the sleep state if the state of the multi-function device 10 is in the D-sleep state 76, the main CPU 36 will receive the supply of the clock and be set to a non-sleep state (normal performance state) if the state of the multi-function device 10 is in the processing state 70, the stand-by state 72, or the L-sleep state 74.

(Processing To Be Executed by Main CPU 36 and Sub CPU 38)

Contents of the processing to be executed by the main CPU 36 and the sub CPU 38 when the mode is set to the first mode are now explained in detail. In this embodiment, the main CPU 36 basically executes the processing in a state where the clock is being supplied to the main CPU 36 (in other words, in the processing state 70, the stand-by state 72, and the L-sleep state 74).

Figure 4:
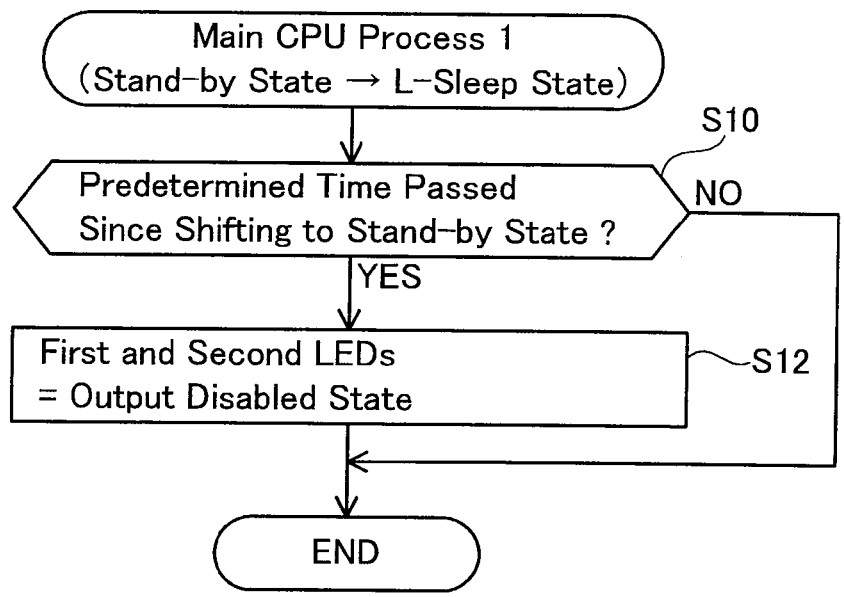
FIG. 4 shows a flowchart of processing to be executed by a main CPU.

FIG. 4 shows the flowchart of the processing to be executed by the main CPU 36 in the stand-by state 72. The main CPU 36 monitors whether a state where a command for executing the foregoing specific processing is not input continues for a predetermined time (S10). If the determination is YES in the foregoing case, the main CPU 36 sends the output disable command to the PHY chip 40 via the MAC chip 42 (S12). Consequently, the PHY chip 40 suspends the supply of current to the first and second LEDs 20, 22. The first and second LEDs 20, 22 are thereby turned off. Although not shown in the flowchart, if the determination is YES at S10, the main CPU 36 sets the light source of the LCD 18 to the unlit state, and suspends the supply of the image data 14a to the LCD 18. The multi-function device 10 thereby shifts from the stand-by state 72 to the L-sleep state 74.

Figure 5:
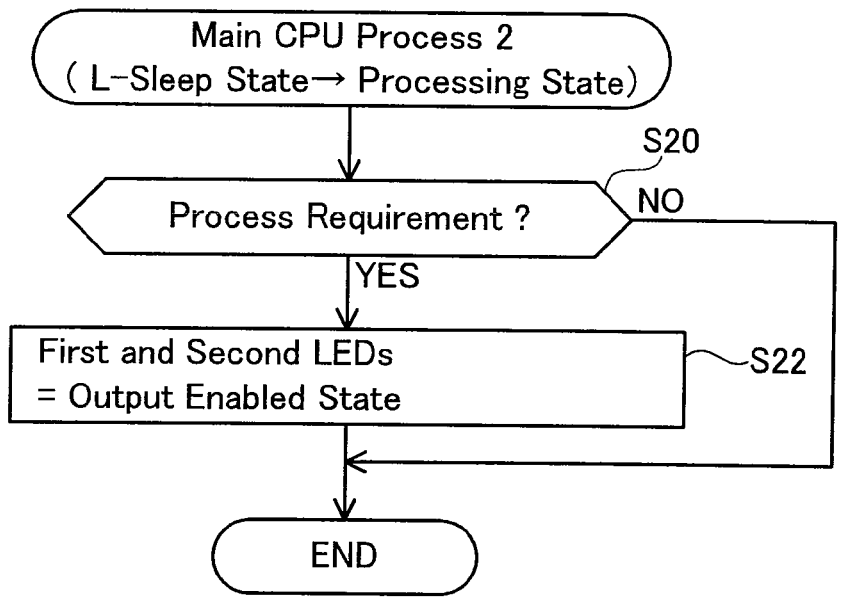
FIG. 5 shows a flowchart of processing to be executed by the main CPU.

FIG. 5 shows the flowchart of the processing to be executed by the main CPU 36 in the L-sleep state 74. The main CPU 36 monitors whether a command for executing the foregoing specific processing is input (S20). If the determination is YES in the foregoing case, the main CPU 36 sends the output enable command to the PHY chip 40 via the MAC chip 42 (S22). Consequently, the PHY chip 40 supplies current to the first and second LEDs 20, 22 according to Speed, Link, and Activity that have been detected by itself. For example, if the line speed of the network 52 is of a predetermined value or higher, the PHY chip 40 supplies current to the first LED 20 and turns on the first LED 20. However, if the line speed is lower than the predetermined value, the PHY chip 40 does not supply current to the first LED 20. In addition, for example, in the link-up state, the PHY chip 40 supplies current to the second LED 22 and turns on the second LED 22. However, in the link-down state, the PHY chip 40 does not supply current to the second LED 22. If data is being communicated, the PHY chip 40 supplies current so that the second LED 22 will blink.

Although not shown in the flowchart, the sub CPU 38 monitors whether the foregoing specific condition (data is not being communicated, and there is no packet for which the main CPU 36 should execute processing) is satisfied in the L-sleep state 74. If the determination is YES in the foregoing case, the sub CPU 38 sends a command for suspending the clock supply to the first clock supplying unit 32. Consequently, the first clock supplying unit 32 suspends the clock supply to the main CPU 36. The state is thereby shifted from the L-sleep state 74 to the D-sleep state 76.

The sub CPU 38 monitors whether a command for executing the foregoing specific processing is input in the D-sleep state 76. If the determination is YES in the foregoing case, the sub CPU 38 sends a command for resuming the clock supply to the first clock supplying unit 32. Consequently, the first clock supplying unit 32 resumes the clock supply to the main CPU 36. The multi-function device 10 thereby shifts from the D-sleep state 76 to the L-sleep state 74. The main CPU 36 to which the clock supply was resumed executes the foregoing specific processing according to the input command. The main CPU 36 additionally sets the light source of the LCD 18 to the lit state, and resumes supplying the image data 14a to the LCD 18. The main CPU 36 further sends the output enable command to the PHY chip 40 via the MAC chip 42. The state thereby shifts from the L-sleep state 74 to the processing state 70.

Figure 6:
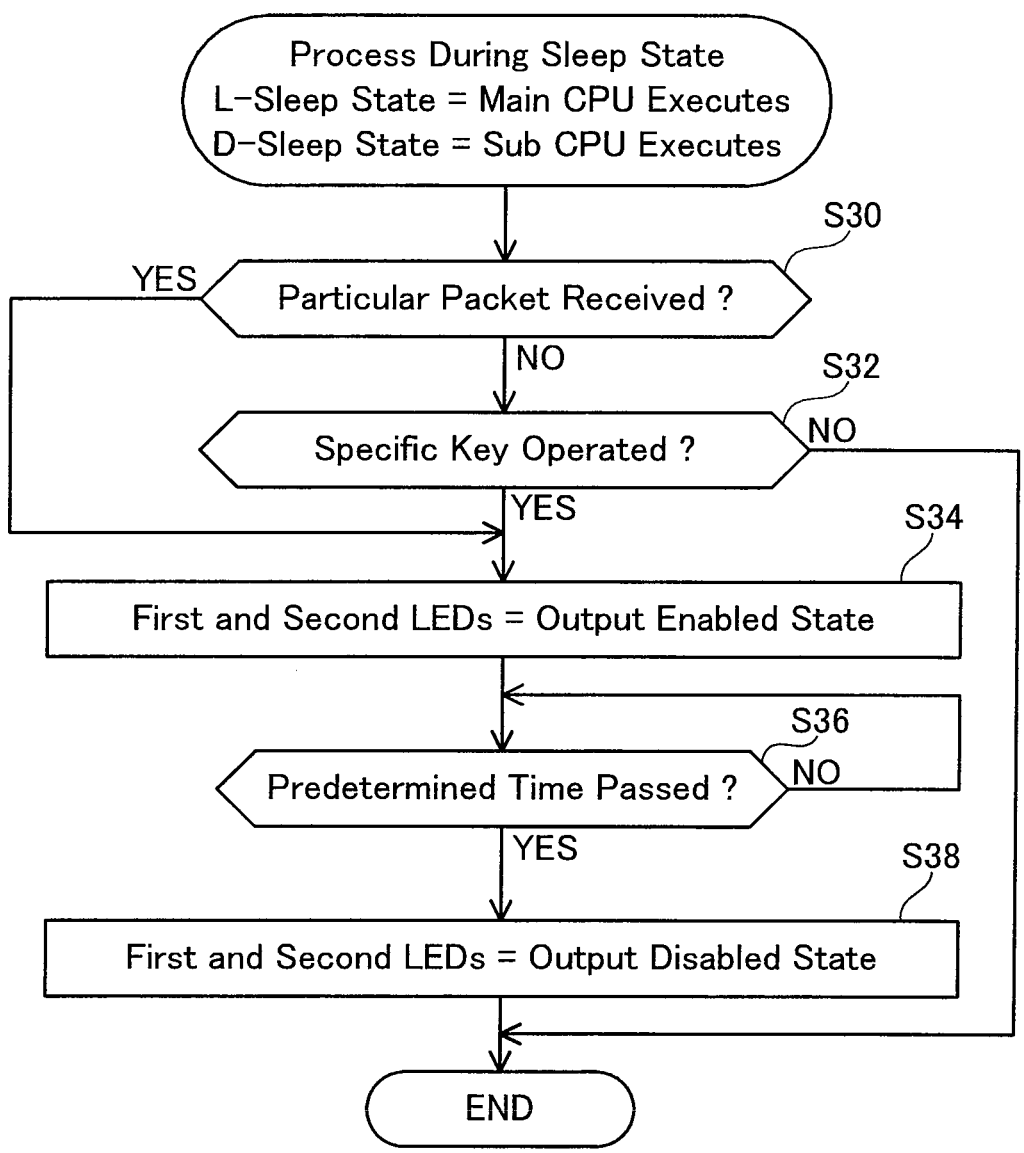
FIG. 6 shows a flowchart of processing to be executed by the main CPU or a sub CPU.

FIG. 6 shows the flowchart of the processing to be executed by the main CPU 36 in the L-sleep state 74. The sub CPU 38 executes the processing showing in FIG. 6 in the D-sleep state 76. The main CPU 36 or the sub CPU 38 monitors the reception of a particular packet (S30). The particular packet can also be rephrased as a packet other than packets for which the main CPU 36 should execute processing. As examples of the packets for which the main CPU 36 should execute processing, for instance, considered may be a print command packet, a packet for requesting the status of the multi-function device 10, a TCP (Transmission Control Protocol) packet and the like. As an example of the particular packet, considered may be an ICMP (Internet Control Message Protocol) packet (ping). Even if the particular packet is received, the L-sleep state 74 or the D-sleep state 76 is maintained without shifting to the processing state 70. If the particular packet is received, the main CPU 36 or the sub CPU 38 determines this to be YES at S30, and proceeds to S34.

The main CPU 36 or the sub CPU 38 also monitors whether the specific key 12b (refer to FIG. 1) is operated (S32). The specific key 12b can be rephrased as a key for performing operations other than the operations for which the main CPU 36 should execute processing. Even if the specific key 12b is operated, the L-sleep state 74 or the D-sleep state 76 is maintained without shifting to the processing state 70. If the specific key 12b is operated, the main CPU 36 or the sub CPU 38 determines this to be YES at S32, and proceeds to S34. If the other keys 12a, 12c shown in FIG. 1 are operated, the main CPU 36 or the sub CPU 38 determines that a command for executing the foregoing specific processing has been input, and executes various types of processing for shifting to the processing state 70 (for example, processing for resuming the clock supply to the main CPU 36, processing for lighting the light source of the LCD 18, processing for sending the output enable command, and the like).

At S34, the main CPU 36 or the sub CPU 38 sends the output enable command to the PHY chip 40 via the MAC chip 42. Consequently, the PHY chip 40 supplies current to the first and second LEDs 20, 22 according to Speed, Link, and Activity that have been detected by itself. The main CPU 36 or the sub CPU 38 waits for a predetermined time to elapse from the time that the first and second LEDs 20, 22 are set to the output enabled state at S34 (in other words, from the time that the output enable command is sent at S34) (S36). When the foregoing predetermined time elapsed, the main CPU 36 or the sub CPU 38 sends the output disable command to the PHY chip 40 via the MAC chip 42 (S38). Consequently, the PHY chip 40 suspends the supply of current to the first and second LEDs 20, 22.

Contents of the processing to be executed by the main CPU 36 and the sub CPU 38 in cases where the mode is set to the first mode have been described in detail above. If the mode is set to the second mode, the first and second LEDs 20, 22 are maintained in the output enabled state in the L-sleep state 74 and the D-sleep state 76. Excluding this point, the processing to be executed by the main CPU 36 and the sub CPU 38 is the same as in the case of the foregoing first mode.

The network system 2 of this embodiment was explained in detail above. As described above, the multi-function device 10 is able to seek power saving by causing the light source of the LCD 18 to be in the unlit state in the L-sleep state 74. Moreover, the multi-function device 10 is able to seek further power saving by suspending the clock supply to the main CPU 36 in the D-sleep state 76.

The user is able to confirm Speed, Link, and Activity by viewing the emission state of the first and second LEDs 20, 22 in the processing state 70 and the stand-by state 72. Meanwhile, in the L-sleep state 74 and the D-sleep state 76, in normal, the necessity for causing the user to understand data communication information (information concerning a communication of data via the network 52) is low. In addition, the first and second LEDs 20, 22 are both provided at the rear face of the multi-function device 10. Thus, in the L-sleep state 74 and the D-sleep state 76, it is considered that the frequency of the user confirming the emission state of the first and second LEDs 20, 22 is low. In this embodiment, if the mode is set to the foregoing first mode, it is possible to realize power saving since the first and second LEDs 20, 22 are in the output disabled state in the L-sleep state 74 and the D-sleep state 76.

If the first and second LEDs 20, 22 are the an output disabled state, the user is able to temporarily set the first and second LEDs 20, 22 to the output enabled state by sending the particular packet from the PC 60 to the multi-function device 10 (YES at S30 of FIG. 6). Moreover, if the first and second LEDs 20, 22 are in the output disabled state, the user is able to temporarily set the first and second LEDs 20, 22 to the output enabled state by operating the specific key 12b (refer to FIG. 1) (YES at S32 of FIG. 6). Even if the determination is YES at S30 or S32 of FIG. 6, the L-sleep state 74 or the D-sleep state 76 is maintained. According to this embodiment, even if the multi-function device 10 is shifted to the L-sleep state 74 or the D-sleep state 76 and the first and second LEDs 20, 22 becomes the output disabled state, the user is able to confirm Speed, Link, and Activity while maintaining the L-sleep state 74 or the D-sleep state 76. Even if the determination is YES at S30 or S32 of FIG. 6, it is possible to inhibit the increase in the power consumption since the first and second LEDs 20, 22 are not continuously in the output enabled state.

Since the foregoing specific key 12b (refer to FIG. 1) is disposed in the vicinity of the I/O port 24 (in other words, in the vicinity of the first and second LEDs 20, 22), the user can operate the specific key 12b that is disposed in the vicinity of the first and second LEDs 20, 22 upon confirming the emission state of the first and second LEDs 20, 22.

As evident from the foregoing explanation, the multi-function device 10 and the PC 60 of this embodiment are respectively examples of a "network device" and an "external device." The first LED 20 and the second LED 22 are respectively examples of a "first light emitting element" and a "second light emitting element." The main CPU 36 is an example of a "light element control unit," a "first processing unit," and an "image data supplying unit." The sub CPU 38 is an example of a "second processing unit." The I/O port 24 and the LCD 18 respectively correspond to a "receiving unit" and a "display unit."

The processing state 70 (or the stand-by state 72 or the L-sleep state 74) of the multi-function device 10 in which the main CPU 36 is set to the non-sleep state as a result of the clock being supplied to the main CPU 36 is an example of a "first performance state," and the D-sleep state 76 of the multi-function device 10 in which the main CPU 36 is set to the sleep state as a result of suspending the clock supply to the main CPU 36 is an example of a "second performance state."

In addition, the processing state 70 (or the stand-by state 72) of the multi-function device 10 in which image data is supplied to the LCD 18 is an example of a "first performance state," and the D-sleep state 76 (or the L-sleep state 74) of the multi-function device 10 in which image data is not supplied to the LCD 18 is an example of a "second performance state."

Modified examples of the foregoing embodiment are listed below.

(1) In the foregoing embodiment, although the first and second LEDs 20, 22 are in the output disabled state in the L-sleep state 74 in the case of the first mode, they may also be in the output enabled state. Specifically, the first and second LEDs 20, 22 may be set to be in the output disabled state only in the D-sleep state 76. In this modified example, the timing of switching the main CPU 36 between the sleep state and the non-sleep state and the timing of switching the first and second LEDs 20, 22 between the output disabled state and the output enabled state will coincide.

(2) In the foregoing embodiment, the L-sleep state 74 may be omitted. Specifically, if a state where a command for executing the foregoing specific processing is not input in the stand-by state 72 continues for the predetermined time (YES at S10 of FIG. 4), the clock supply to the main CPU 36 may be suspended, the light source of the LCD 18 may become the unlit state, and, in the first mode, the first and second LEDs 20, 22 may be in the output disabled state.

(3) In the foregoing embodiment, if the mode is set to the first mode, and a state where a command for executing the foregoing specific processing is not input in the stand-by state 72 continues for the predetermined time (YES at S10 of FIG. 4), the light source of the LCD 18 becomes the unlit state, and the first and second LEDs 20, 22 become the output disabled state (S12 of FIG. 4). Nevertheless, it the timing that the YES will be determined at S10 of FIG. 4 is known in advance, the first and second LEDs 20, 22 may be set to the output disabled state a predetermined period before the timing. Upon subsequently reaching that timing, the light source of the LCD 18 may be set to the unlit state.

(4) In the foregoing embodiment, the main CPU 36 is changed to the sleep state by discontinuing the clock supply to the main CPU 36. Nevertheless, the main CPU 36 may be changed to the sleep state by reducing the clock frequency without discontinuing the clock supply to the main CPU 36.

(5) In the foregoing embodiment, in the case of the first mode, the first and second LEDs 20, 22 are set to the output disabled state in the L-sleep state 74 or the D-sleep state 76. Nevertheless, power saving may be realized by setting the first and second LEDs 20, 22 to the output enabled state and reducing the amount of current to be supplied to the first and second LEDs 20, 22 in comparison to the processing state 70 or the stand-by state 72. That is, power saving may be realized by allowing the first and second LEDs 20, 22 to emit light with high luminance in the processing state 70 or the stand-by state 72, and allowing the first and second LEDs 20, 22 to emit light with low luminance in the L-sleep state 74 or the D-sleep state 76. Furthermore, power saving may be realized by allowing the first and second LEDs 20, 22 to continuously light in the processing state 70 or the stand-by state 72, and allowing the first and second LEDs 20, 22 to blink in the L-sleep state 74 or the D-sleep state 76 (in other words, to reduce the emission frequency).

(6) In the foregoing embodiment, the PHY chip 40 detects Speed, Link, and Activity, and controls the amount of current to be supplied to the first and second LEDs 20, 22 according to the detection result. Nevertheless, the main CPU 36, the sub CPU 38, or the MAC chip 42 may also use information from the PHY chip 40 to detect Speed, Link, and Activity, and send a command for lighting, blinking, unlighting or the like to the PHY chip 40 according to the detection result.

(7) In addition, the processing shown in FIG. 4 and FIG. 5 may be executed by the sub CPU 38. In the case of the L-sleep state 74, the processing shown in FIG. 6 may be executed by the sub CPU 38.

(8) In the foregoing embodiment, the multi-function device 10 is configured to be switchable between the first mode and the second mode. Nevertheless, this mode switching may be omitted, and the multi-function device 10 may be configured such that the first and second LEDs 20, 22 are always in the output disabled state in the L-sleep state 74 and the D-sleep state 76.

(9) The technology of the foregoing embodiment can also be applied to other network devices of PC, server, printer, scanner, telephone device, facsimile device and the like.

(10) The foregoing term of "non-sleep state" may also be rephrased, but not limited to, as "execution state." In addition, the foregoing term of "sleep state" may also be rephrased, but not limited to, as "state with lower power consumption than the non-sleep state."

What is claimed is:

1. A network device configured to be connected with an external device in a communicable manner via a network, the network device comprising:
   a first light emitting element configured to indicate a first type of information concerning a communication of data via the network;
   a light emitting element control unit configured to control the first light emitting element;
   a first processing unit configured to execute a process for data to be communicated with the external device when the network device is set in a first performance state; and
   a second processing unit configured to execute a process for data to be communicated with the external device when the network device is set in a second performance state,
   wherein the network device is configured to be set in any one of a plurality of performance states including the first performance state and the second performance state, the first performance state being a state in which the first processing unit is set in a non-sleeping state, the second performance state being a state in which the first processing unit is set in a sleeping state, power consumption in the second performance state being smaller than power consumption in the first performance state, and
   wherein the light emitting element control unit is configured to:
      allow emission of the first light emitting element in a first case where the network device is set in the first performance state; and
      control the first light emitting element in a second case where the network device is set in the second performance state such that power consumption of the first light emitting element in the second case is smaller than power consumption of the first light emitting element in the first case.

2. The network device as in claim 1, wherein
the light emitting element control unit is configured to prohibit emission of the first light emitting element in the second case.

3. The network device as in claim 2, wherein
the light emitting element control unit is configured to allow, when a predetermined condition is satisfied in the second case, emission of the first light emitting element in a particular period while the network device is maintained in the second performance state.

4. The network device as in claim 3, further comprising:
an operation unit configured to be operated by a user,
wherein the predetermined condition is satisfied in a case where a predetermined operation is performed by the user through the operation unit.

5. The network device as in claim 3, further comprising:
a receiving unit configured to receive data sent from the external device via the network,
wherein the predetermined condition is satisfied in a case where the receiving unit receives particular data from the external device.

6. The network device as in claim 1, further comprising:
a second light emitting element configured to indicate a second type of information concerning the communication of data via the network, the second type of information being different from the first type of information,
wherein the light emitting element control unit is configured to:
allow emission of the second light emitting element in the first case; and
control the second light emitting element in the second case such that power consumption of the second light emitting element in the second case is smaller than power consumption of the second light emitting element in the first case.

7. The network device as in claim 1, wherein
the first type of information includes at least one of: (a) information indicating a line speed of the network; (b) information indicating whether data being communicated via the network exists; and (c) information indicating whether the network device is being connected with the network in a communicable manner with the external device.

8. The network device as in claim 1, further comprising:
a display unit; and
an image data supplying unit configured to supply image data to the display unit, the image data representing an image to be displayed,
wherein the first performance state is a state in which the image data supplying unit supplies the image data to the display unit, and
the second performance state is a state in which the image data supplying unit does not supply the image data to the display unit.

9. The network device as in claim 1, further comprising:
a clock supplying unit configured to supply a clock to the first processing unit,
wherein the non-sleeping state is a state in which the clock supply unit is supply the clock to the first processing unit, and
wherein the sleeping state is a state in which the clock supply unit is not supplying the clock to the first processing unit.

* * * * *